United States Patent
Wang et al.

(10) Patent No.: US 12,417,202 B2
(45) Date of Patent: Sep. 16, 2025

(54) EXPANSION APPARATUS FOR COOPERATING WITH COMPUTING DEVICE AS WELL AS COMPUTING SYSTEM

(71) Applicant: BOE TECHNOLOGY GROUP CO., LTD., Beijing (CN)

(72) Inventors: Hong Wang, Beijing (CN); Yushun Jie, Beijing (CN); Shuo Chen, Beijing (CN); Xinxin Mu, Beijing (CN); Xinyi Cheng, Beijing (CN); Tao Li, Beijing (CN); Yangyang Zhang, Beijing (CN); Feng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/907,355

(22) PCT Filed: Oct. 22, 2021

(86) PCT No.: PCT/CN2021/125619
§ 371 (c)(1),
(2) Date: Sep. 26, 2022

(87) PCT Pub. No.: WO2022/227436
PCT Pub. Date: Nov. 3, 2022

(65) Prior Publication Data
US 2024/0296134 A1    Sep. 5, 2024

(30) Foreign Application Priority Data

Apr. 28, 2021   (CN) .......................... 202110465040.3

(51) Int. Cl.
*G06F 13/40* (2006.01)
*G06F 13/38* (2006.01)

(52) U.S. Cl.
CPC ........ *G06F 13/385* (2013.01); *G06F 13/4068* (2013.01); *G06F 2213/0042* (2013.01)

(58) Field of Classification Search
CPC ............... G06F 13/385; G06F 13/4068; G06F 2213/0042

(Continued)

(56) References Cited

U.S. PATENT DOCUMENTS

2002/0181249 A1*  12/2002  Coffey .................... H02J 1/001
                                                            363/1
2003/0083101 A1*  5/2003  Feller .................... H04W 88/02
                                                            370/912

(Continued)

FOREIGN PATENT DOCUMENTS

CN    111258943 A    6/2020
CN    210807520 U    6/2020

(Continued)

OTHER PUBLICATIONS

International Search Report received for PCT Patent Application No. PCT/CN2021/125619, mailed on Jan. 26, 2022, 5 pages (2 pages of English Translation and 3 pages of Original Document).

*Primary Examiner* — Christopher B Shin
(74) *Attorney, Agent, or Firm* — Calfee, Halter & Griswold LLP (57) ABSTRACT

An expansion apparatus for incorporating with a computing device and a computing system including the expansion apparatus are disclosed. The computing device includes a first OPS port. The expansion apparatus includes: a second OPS port configured for coupling to the first OPS port of the computing device; and a network adapter configured for connecting the computing device to a network, wherein the network adapter is connected with a data terminal of the second OPS port for data communication.

12 Claims, 6 Drawing Sheets

(58) Field of Classification Search
USPC .......................................................... 710/313
See application file for complete search history.

(56) References Cited

U.S. PATENT DOCUMENTS

| | | | |
|---|---|---|---|
| 2007/0049338 A1 | 3/2007 | He et al. | |
| 2011/0276568 A1* | 11/2011 | Fotev ................. | G06F 16/3331 |
| | | | 707/E17.064 |
| 2016/0085280 A1* | 3/2016 | Harel .................... | G06F 1/3287 |
| | | | 710/14 |
| 2018/0101392 A1* | 4/2018 | Chew .................... | G06F 9/4406 |
| 2020/0142709 A1* | 5/2020 | Chew ........................ | G06F 1/24 |
| 2020/0183687 A1 | 6/2020 | Asanovic et al. | |
| 2021/0081160 A1* | 3/2021 | Chang ................... | G06F 3/1423 |
| 2022/0029366 A1* | 1/2022 | Cross ..................... | G09G 5/003 |

FOREIGN PATENT DOCUMENTS

| | | |
|---|---|---|
| CN | 211642633 U | 10/2020 |
| CN | 212034183 U | 11/2020 |
| CN | 212084130 U | 12/2020 |
| CN | 212343803 U | 1/2021 |
| CN | 112422903 A | 2/2021 |
| CN | 212627951 U | 2/2021 |
| CN | 215341062 U | 12/2021 |

\* cited by examiner

EXPANSION APPARATUS FOR COOPERATING WITH COMPUTING DEVICE AS WELL AS COMPUTING SYSTEM

RELATED APPLICATIONS

The present application is a 35 U.S.C. 371 national stage application of PCT International Application No. PCT/CN2021/125619, filed on Oct. 22, 2021, which claims priority to Chinses patent application No. 202110465040.3 filed on Apr. 28, 2021, the entire disclosures of which are incorporated herein by reference.

TECHNICAL FIELD

The present disclosure relates to the field of computer technology, and in particular, to an expansion apparatus for cooperating with a computing device and a computing system including the expansion apparatus.

BACKGROUND

In the field of computer technology, a computing device (such as a conference interaction device) often needs to access a network to communicate with another device, for example, a terminal computing device can communicate with a server to obtain corresponding services. Generally speaking, a computing device can be integrated with a wired or wireless network card for accessing a computer network during the production process, so as to realize the network communication function. However, in actual use, the single network access manner may not be enough. Exemplarily, for a computing device such as a conference interaction tablet, its mainboard circuit typically includes only a wireless network card that supports Wi-Fi. Therefore, in the situation that there is no Wi-Fi device (such as a router) nearby or the Wi-Fi device fails, the computing device will not be able to access a network.

SUMMARY

In view of this, the present disclosure provides a apparatus and a system that can alleviate, reduce or even eliminate the above-mentioned problems.

According to an aspect of the present disclosure, there is provided an expansion apparatus for cooperating with a computing device, the computing device including a first OPS port, the expansion apparatus including: a second OPS port configured for coupling to the first OPS port of the computing device; a network adapter configured for connecting the computing device to a network, wherein the network adapter is connected with a data terminal of the second OPS port for data communication.

In the expansion apparatus according to some embodiments of the present disclosure, the network adapter is further connected with a power terminal of the second OPS port for power transmission.

In some embodiments of the present disclosure, the expansion apparatus further includes a first transformer, wherein the network adapter is connected with the power terminal of the second OPS port via the first transformer.

In some embodiments of the present disclosure, the expansion apparatus further includes a third OPS port configured for coupling to an OPS apparatus, wherein a data terminal and a power terminal of the third OPS port are respectively connected with the data terminal and the power terminal of the second OPS port.

In some embodiments of the present disclosure, the expansion apparatus further includes a data port expander, wherein the data terminal of the second OPS port is respectively connected with the data terminal of the third OPS port and the network adapter via the data port expander.

In some embodiments of the present disclosure, the expansion apparatus further includes a second transformer, and wherein the data port expander is connected via the second transformer with the power terminal of the second OPS port for power transmission.

In some embodiments of the present disclosure, the expansion apparatus further includes a data communication port, wherein the network adapter is connected with the data terminal of the second OPS port via the data communication port.

In some embodiments of the present disclosure, the expansion apparatus further includes a power port, wherein the network adapter is connected with the power terminal of the second OPS port via the power port.

In the expansion apparatus according to some embodiments of the present disclosure, the data communication port includes a universal serial bus port.

In the expansion apparatus according to some embodiments of the present disclosure, the network adapter includes a mobile communication network adapter.

In the expansion apparatus according to some embodiments of the present disclosure, the computing device includes a conference interaction device.

In the expansion apparatus according to some embodiments of the present disclosure, the second transformer includes at least one of a DC-DC converter and a low dropout linear regulator.

In the expansion apparatus according to some embodiments of the present disclosure, the coupling includes pluggable coupling.

In the expansion apparatus according to some embodiments of the present disclosure, the coupling includes pluggable coupling.

In the expansion apparatus according to some embodiments of the present disclosure, the connection includes a pluggable connection.

According to another aspect of the present disclosure, there is provided a computing system including: a computing device including a first OPS port; an expansion apparatus including: a second OPS port configured for pluggably coupling to the first OPS port of the computing device; a network adapter configured for connecting the computing device to a network, wherein the network adapter is connected with a data terminal of the second OPS port for data communication.

In the computing system according to some embodiments of the present disclosure, the computing device includes: a mainboard including a first data port; an OPS adapter including a second data port and the first OPS port, wherein the second data port is connected with the first data port, and a data terminal of the first OPS port is connected with the second data port.

In the computing system according to some embodiments of the present disclosure, the OPS adapter further includes a fourth OPS port configured for pluggably coupling to an OPS apparatus, and a data terminal of the fourth OPS port is connected with the second data port.

In the computing system according to some embodiments of the present disclosure, the OPS adapter further includes a data port expander, wherein the second data port is respectively connected with the data terminal of the first OPS port and the data terminal of the fourth OPS port via the data port expander.

In the computing system according to some embodiments of the present disclosure, the computing device further includes a power source configured for at least one of the following: providing power to the mainboard; and providing power to the expansion apparatus through the OPS adapter.

According to the embodiments described hereinafter, these and further aspects of the present disclosure will be clarified, and will be explained with reference to the embodiments described below.

BRIEF DESCRIPTION OF DRAWINGS

Further details, features and advantages of the present disclosure are disclosed in the following description about exemplary embodiments in conjunction with the accompanying drawings, in which.

It should be understood that the drawings are schematic only and not necessarily to scale. Also, in the drawings, some technical features may be omitted for the sake of brevity.

DETAILED DESCRIPTION OF EMBODIMENTS

With respect to the network access problem mentioned above, the applicant has found that, according to the related art, the following two solutions can be used to support accessing a certain network and expand the network access function. The first solution is to add an external device, for example, the external device may be a device that supports a certain network access function. For example, a computing device such as a conference tablet can be added with an external device that supports a mobile communication network access function such as a 4G or 5G network. The external device may be externally connected to the computing device through, for example, a USB (Universal Serial Bus) interface. However, the connection between the external device and the computing device may not be tight and firm, resulting in poor contact; at the same time, the external device may have a negative impact on the appearance of the computing device and the convenience of movement. The second solution is to modify the mainboard circuit of the computing device, and to integrate an apparatus supporting a certain network access function into the computing device. For example, the mainboard circuit of a computing device such as a conference tablet can be modified to add a circuit system that supports a 4G or 5G network access function. However, modifying a mainboard circuit requires a significant budget, additional labor and time, and is difficult to solve the network support problem of the computing devices that are already produced.

Based on the above analysis, the applicant has further found that, in the related technical field, there is a need to allow a computing device to access an additional network without adding an external device and without modifying a mainboard circuit, for example, allowing a computing device, such as a conference tablet with the mainboard circuit integrated with only Wi-Fi function, to access a mobile communication network such as a 4G or 5G network.

Therefore, the applicant has proposed a technical solution for expanding the network access function for a computing device based on OPS port. Before explaining the technical solution of the present disclosure in detail, some concepts are briefly introduced first.

In the present disclosure, a "port" may refer to a structure for realizing coupling between two devices or apparatuses, and may also be referred to as an "interface". The "port" mentioned in the present disclosure may cover the ports in both physical and logical senses. In a physical sense, a "port" means a physical port used to implement functions such as data and/or power transmission between a certain device or apparatus and another device or apparatus. Exemplarily, the two devices or apparatuses may each include a male port and a female port that match each other, such that the two devices or apparatuses can be coupled together by the matching of the included male and female ports to realize transmission of data and/or power, and the like. In a logical sense, a "port" means a logical port that follows a certain protocol to transmit data and/or power etc. between different devices or apparatuses according to the protocol. For example, two devices or apparatuses may each include a port that follows a same protocol, so that the two devices or apparatuses can be coupled together based on the protocol to realize the transmission of data and/or power, etc.

In the present disclosure, an "OPS port" may refer to a port that complies with the OPS specification (Open Pluggable Specification), and may also be referred to as an "OPS interface". The OPS specification is a standardized specification released by Intel for realizing coupling between a pluggable apparatus and other devices, which includes different versions, such as OPS-C. OPS-C+, etc. In the present disclosure, when referring to "OPS", it should be understood to cover different versions of the OPS specification, such as OPS-C, OPS-C+, etc.

In the present disclosure, an "OPS apparatus" may refer to a pluggable apparatus that includes an OPS port and can transmit data and/or power, etc., through the OPS port. For example, for a conference tablet, it typically includes an OPS port that allows access to an OPS apparatus. For example, a conference tablet is typically integrated with a SoC (System on Chip) board that supports the Android system, and optionally, it can be connected to an OPS box that supports the Windows system through an OPS port, thereby realizing dual systems to expand functions of the conference tablet.

In the present disclosure, a "terminal" may refer to a structure exposed in a port for forming a coupling relationship with another port. In a physical sense, it may refer to a pin or needle for connection; and in a logical sense, it may refer to an input/output part of a port responsible for the transmission of data and/or power, etc. A "data terminal" may refer to one terminal or a group of terminals responsible for data transmission, and a "power terminal" may refer to one terminal or a group of terminals responsible for power transmission.

In the present disclosure, a "network" may refer to various wired or wireless networks, such as at least one of a broadband network, a Wi-Fi network, 2G, 3G, 4G, 5G and other mobile communication networks.

Furthermore, it will be understood that, although the terms "first", "second", etc., may be used herein to describe various apparatuses, features or parts, these apparatuses, features or parts should not be limited by these terms. These terms are only used to distinguish one (or a group of) apparatus(es), feature(s) or part(s) from another (or another group of) apparatus(es), feature(s) or part(s). It should also be understood that the words "connection", "coupling" or the like mentioned in the present disclosure may refer to a solution of direct connection or direct coupling, or may also refer to a solution of indirect connection or indirect coupling realized via one or more intermediate apparatuses, components, etc. In some embodiments, the words "connection" and "coupling" or the like may refer to fixed connections, couplings, and the like, and may also refer to pluggable (or detachable) connections, couplings, and the like. For example, in the description that one element or apparatus is connected/coupled to another element or apparatus, it may mean that one element or apparatus is fixedly connected/coupled to another element or apparatus, or it may mean that one element or apparatus is pluggably connected/coupled to another element or apparatus.

Figure 1:
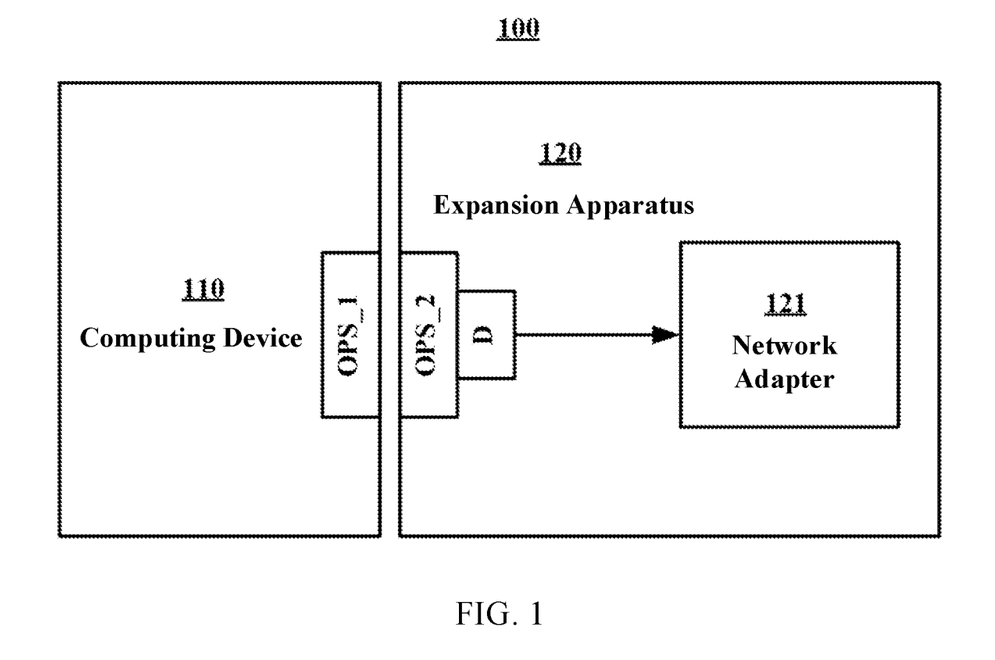
FIG. 1 schematically shows an expansion apparatus and a computing system according to some embodiments of the present disclosure.

FIG. 1 schematically shows an expansion apparatus 120 and a computing system 100 including the expansion apparatus 120 in accordance with some embodiments of the present disclosure.

As shown in FIG. 1, the computing system 100 includes a computing device 110 and the expansion apparatus 120. The computing device 110 includes a first OPS port OPS_1. For example, the computing device 110 may include a conference interaction device, such as a conference tablet or the like. The expansion apparatus 120 for cooperating with the computing device 110 includes a second OPS port OPS_2 and a network adapter 121. The second OPS port OPS_2 of the expansion apparatus 120 is configured for coupling to the first OPS port OPS_1 of the computing device 110, for example, being fixedly or pluggably coupled to the first OPS port OPS_1 of the computing device 110, so as to realize data and/or power transmission between the expansion apparatus 120 and the computing device 110. The network adapter 121 of the expansion apparatus 120 is configured for connecting the computing device 110 to a network, so that sending and/or receiving data can be implemented via the network that is accessed. For example, the network adapter 121 may include a mobile communication network adapter to connect the computing device 110 to a mobile communication network, such as a 2G, 3G, 4G or 5G mobile communication network, etc. The network adapter 121 may be connected with a data terminal D of the second OPS port OPS_2 to realize data communication. For example, the network adapter 121 may be a 2G module, a 3G module, a 4G module, or a 5G module, etc., which may be in the form of, for example, a printed circuit board integrated with radio frequency and baseband. Thus, the computing device 110 can obtain an access function to a corresponding network via the expansion apparatus 120. Specifically, the computing device 110 can access a corresponding network by means of the network adapter 121 via a data channel consisting of the coupling between the first OPS port OPS_1 and the second OPS port OPS_2 as well as the connection between the data terminal D of the second OPS port OPS_2 and the network adapter 121, and can receive and/or send data through the connected network, for example, send data to a server and/or receive data from the server, so as to use the services provided by the server. It should be understood that the data terminal D shown in FIG. 1 may be all or some of the terminals available for data transmission in the second OPS port OPS_2.

In an embodiment of the present disclosure, the expansion apparatus 120 for cooperating with the computing device 110 may be a pluggable apparatus that can provide the computing device with the extending function of accessing to one or more networks (such as one or more of 2G, 3G, 4G, 5G or other networks). Since an OPS port is typically provided within the housing of a computing device and may allow for tight, secure coupling, the expansion apparatus 120 coupled through OPS may allow the computing device 110 to be provided with a function of accessing to one or more networks without using an external device. In addition, for a computing device with an OPS port, such as the aforementioned conference tablet, the above-mentioned expansion apparatus 120 may be used without modifying the internal circuit of the computing device. Alternatively, even for a computing device that does not originally have an OPS port, it is also possible to realize the conversion of one or more original ports to OPS ports by adding a structure such as an OPS adapter board on the basis of its internal circuit (without modifying the original internal circuit). Then, the expansion apparatus 120 described above can be used.

In the expansion apparatus for cooperating with a computing device according to some embodiments of the present disclosure, by designing an OPS port, the structure of the mainboard interface of the computing device is fully utilized (for example, an OPS port for coupling an OPS box), such that its network communication function (such as 5G) is effectively expanded without modifying or redesigning the structure of the internal mainboard of an interactive device; moreover, the expansion apparatus can be coupled to the mainboard of the computing device inside the whole machine thereof, avoiding the contact and aesthetic problems caused by an external device. At the same time, due to the simple structure design, the development cost is reduced and the work efficiency is improved.

Figure 2:
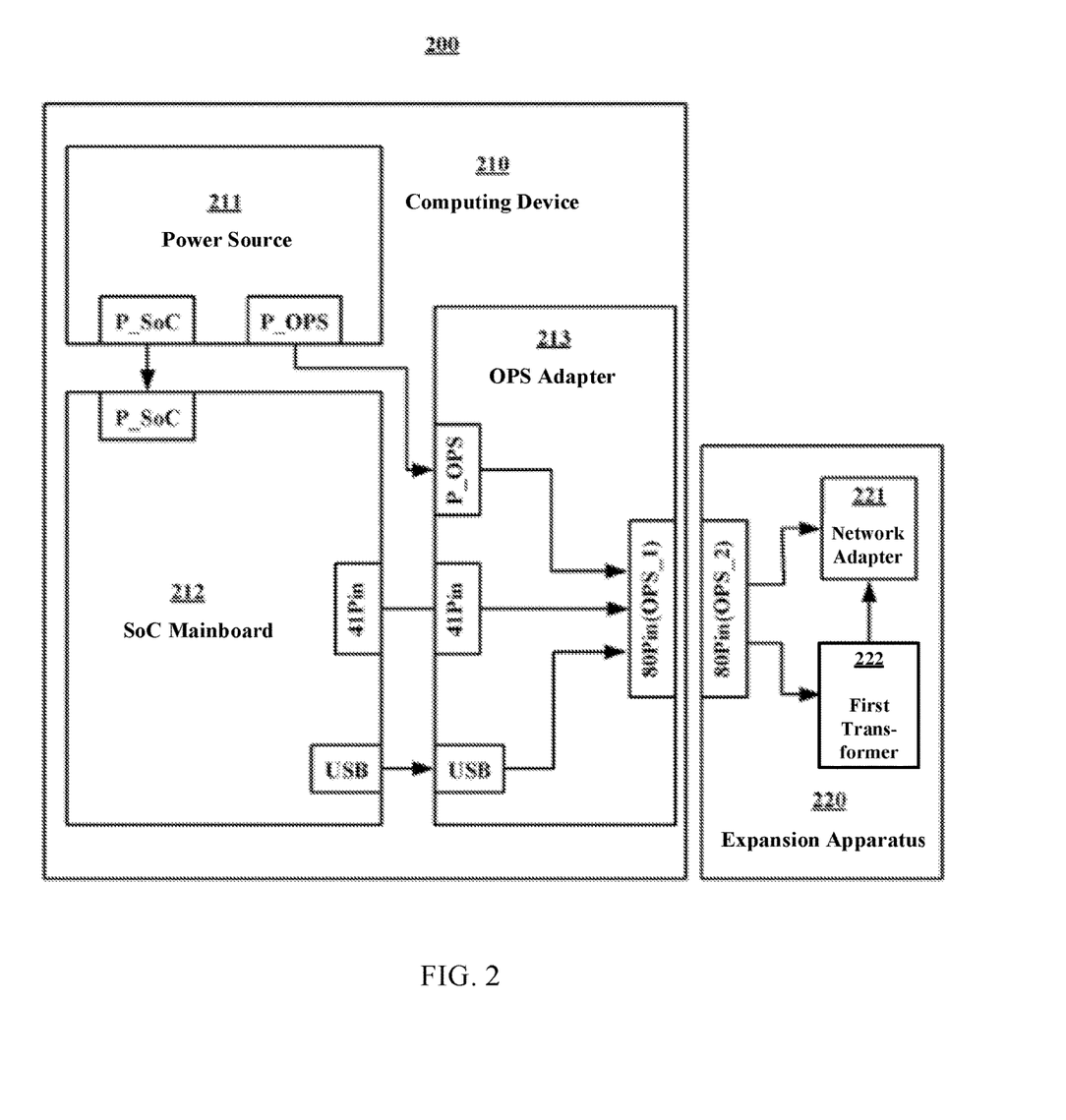
FIG. 2 schematically shows an expansion apparatus and a computing system according to some embodiments of the present disclosure.

FIG. 2 schematically shows an expansion apparatus 220 and a computing system 200 including the expansion apparatus 220 in accordance with some embodiments of the present disclosure.

As shown in FIG. 2, the computing system 200 includes a computing device 210 and the expansion apparatus 220 for cooperating with the computing device 210. Similar to FIG. 1, the computing device 210 includes the first OPS port OPS_1, the expansion apparatus 220 includes the second OPS port OPS_2 and a network adapter 221, which are similarly coupled or connected. For the sake of brevity, in FIG. 2 and the following figures, the drawing of terminals is omitted, but it should be understood that each of the drawn ports may include one or more terminals.

For example, an OPS port may take the form of an 80 Pin port as shown therein, but other forms of a port may also be used according to actual needs. In general, an 80 Pin port may include 80 pins or needles, some of which can be configured to deliver data, such as TMDS (Transition-minimized differential signaling) signals, display signals, audio signals, control signaling, and data transmitted based on the USB protocol, the UART (Universal Asynchronous Receiver/Transmitter) protocol, etc. The other pins or needles can be configured to deliver power, such as the power of 12-19 V.

In some embodiments, the network adapter 221 may also be connected with a power terminal of the second OPS port OPS_2 for power transmission. Thereby, the network adapter 221 can be powered via the coupling between the second OPS port OPS_2 and the first OPS port OPS_1, allowing it to draw power from the computing device 210. Optionally, the network adapter 221 may also be provided with power in other ways, such as a built-in power supply in the expansion apparatus or being connected to a power supply via other ports.

In some embodiments, the expansion apparatus 220 may further include a first transformer 222 through which the network adapter 221 can be connected to a power terminal of the second OPS port OPS_2. For example, the first transformer 222 may be a DC transformer, the input end of which may be connected to the power terminal of the second OPS port OPS_2, and the output end may be connected to a power terminal of the network adapter 221, to convert the voltage at the power terminal of the second OPS port OPS_2 into a voltage usable by the network adapter 221.

In some embodiments, the computing device 210 may include a mainboard and an OPS adapter 213. The mainboard may be, for example, the SoC mainboard 212 shown in FIG. 2 or other forms of mainboard, and may include a first data port. The first data port may include a port on the mainboard used for data transmission, or may include a part of the port. For example, the first data port may include the part in the 41 Pin port and/or the USB port the part used for data transmission, both of which are shown in FIG. 2, or may also include other types of ports used for data transmission. Specifically, the 41 Pin port and/or the USB port, or the like, may be used to deliver both data and power, that is, it may have both data terminals and power terminals, and the first data port may only include a part related to data terminals or some of the part related to data terminals. Correspondingly, the OPS adapter 213 may include a second data port and the above-mentioned first OPS port OPS_1. The second data port may include a port of a type matching the first data port of the mainboard and be coupled to the first data port for data transmission between the mainboard and the OPS adapter. For example, the second data port may include the part in the 41 Pin port and/or the USB port used for data transmission, both of which are shown in FIG. 2, or may also include other types of ports used for data transmission. The data terminals of the first OPS port (the 80 Pin port as shown in the figure) and the second data port ((all or part of) the data terminals in the 41 Pin port and the USB port as shown in the figure) can be correspondingly connected, so that the conversion from the data port included in the mainboard to the OPS port can be realized.

In some embodiments, the computing device 210 may further include a power source 211, which may be configured for at least one of the following: providing power to the mainboard (such as the SoC mainboard 212), and providing power to the expansion apparatus 220 through the OPS adapter 213. The power source 211 may refer to a structure for providing electrical power in the computing device 210, which may be, for example, a built-in power supply and related circuits or a circuit including, for example, a plug structure for connecting to an external power supply. As shown in the figure, the power source 211 may include a port P_SoC for providing power to the SoC mainboard 212 that may include a port corresponding thereto. The two ports can be coupled together to supply power to the SoC mainboard 212 through the power source 211. Alternatively or additionally, the power source 211 may include a port P_OPS for providing electrical power to the OPS adapter 213 that may include a port corresponding thereto. The two ports can be coupled together to supply power to the OPS adapter 213 through the power source 211, and then to the expansion apparatus 220 coupled (fixedly coupled or pluggably coupled) with the OPS adapter 210. In this embodiment, the power port P_OPS in the OPS adapter 213 may have a power terminal and may be connected to a power terminal of the first OPS port (such as the 80 Pin port) in the OPS adapter 213. In addition or alternatively, the power terminal in the 41 Pin port and/or USB port shown in FIG. 2 can be connected to the power terminal in the first OPS port (such as the 80 Pin port) in the OPS adapter 213. Thus, the power source 211 in the computing device 210 can directly (via the port P_OPS) or indirectly (via the SoC main board 212) supply power to the expansion apparatus 220 coupled (fixedly coupled or pluggably coupled) with the OPS adapter 213.

In the embodiment shown in FIG. 2, the expansion apparatus 220 can be implemented based on the housing of an OPS apparatus in the related technology. For example, a network adapter supporting one or more networks (such as a network adapter in the form of a PCB, etc.) can be set in the housing of the OPS apparatus, and the network adapter can be connected to a data terminal and/or a power terminal of the OPS port on housing of the OPS apparatus, and the circuit structure such as a transformer can be optionally set as required. Therefore, the expansion apparatus 220 can be designed and produced more conveniently, further reducing the input of labor, time and other costs.

Figure 3:
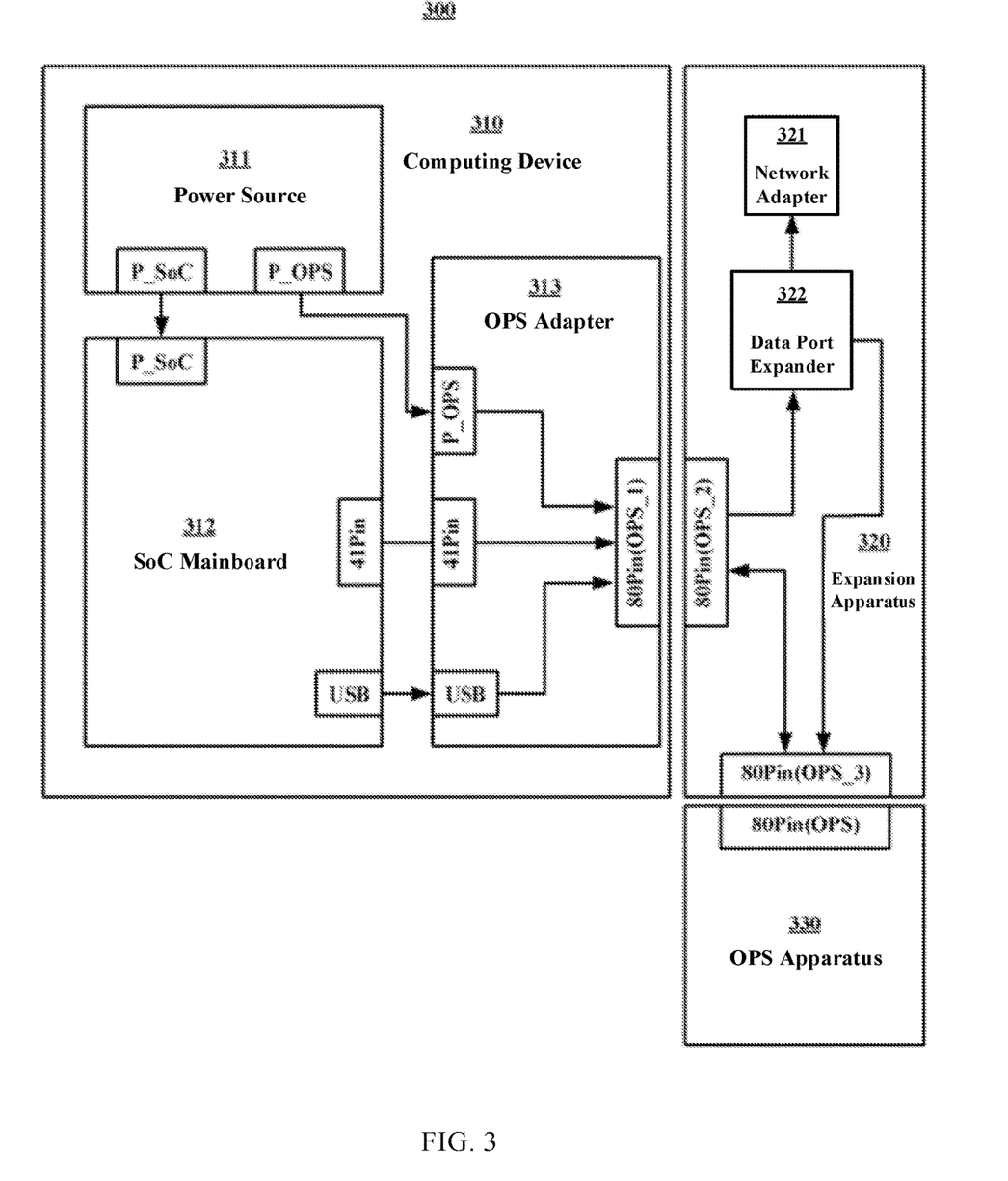
FIG. 3 schematically shows an expansion apparatus and a computing system according to some embodiments of the present disclosure.

FIG. 3 schematically shows an expansion apparatus 320 and a computing system 300 that includes the expansion apparatus 320 in accordance with other embodiments of the present disclosure.

As shown in FIG. 3, the computing system 300 includes the computing device 310 and the expansion apparatus 320 for cooperating with the computing device 310. Similar to FIGS. 1 and 2, the computing device 310 includes the first OPS port OPS_1, the expansion apparatus 320 includes the second OPS port OPS_2 and a network adapter 321, which are similarly coupled or connected. The structure of the computing device 310 shown in FIG. 3 is basically the same as that of the computing device 210 shown in FIG. 2, the description of which will not be repeated here. The differences between the expansion apparatus 320 and the expansion apparatus 220) will be described hereinafter.

Compared with the expansion apparatus 220 shown in FIG. 2, the second OPS port OPS_2 and the network adapter 321 included in the expansion apparatus 320 may be arranged similarly to the description with respect to the expansion apparatus 220, and the various embodiments described with respect to the expansion apparatus 220 of FIG. 2 may also be applied to the expansion apparatus 320 shown in FIG. 3.

In the embodiment shown in FIG. 3, compared to the expansion apparatus 220 shown in FIG. 2, the expansion apparatus 320 may further include a third OPS port OPS_3 configured for coupling (fixed coupling or pluggable coupling) to an OPS port of the OPS apparatus 330. A data terminal and a power terminal of the third OPS port OPS_3 may be connected with the data terminal and the power terminal of the second OPS port OPS_2, respectively. Similarly, the third OPS port OPS_3 can also take the form of an 80 Pin port, or take other forms of port as required.

In some embodiments, the expansion apparatus 320 may further include a data port expander 322. The data port expander 322 can be used to expand one data port into at least two data ports, wherein the data port may be an actual data port, or may also be an equivalent data port formed by one data terminal or a group of data terminals. The network adapter 321 and the data terminal of the third OPS port OPS_3 may be respectively connected to the data terminal in the second OPS port OPS_2 via the data port expander 322.

In some embodiments, the expansion apparatus 320 may further include a second transformer, and the data port expander 322 may be connected to the power terminal of the second OPS port OPS_2 via the second transformer for power transmission, so that the data port expander 322 is powered through the second OPS port OPS_2. Optionally, the data port expander 322 may also be provided with power in other ways, such as a built-in power supply in the expansion apparatus or being connected to a power supply via other ports.

The various embodiments described with respect to FIG. 3 allow the network access function to be extended by the OPS port of the computing device, while the other functions of the computing device can also be extended by means of accessing an OPS apparatus. Exemplarily, for a computing device such as a conference tablet, while adding an expansion apparatus to provide it with 4G, 5G and other network access functions, it is still allowed to be provided with other extended functions by accessing an OPS box, such as providing an additional Windows system for a conferencing tablet device that supports only the Android system.

Figure 4:
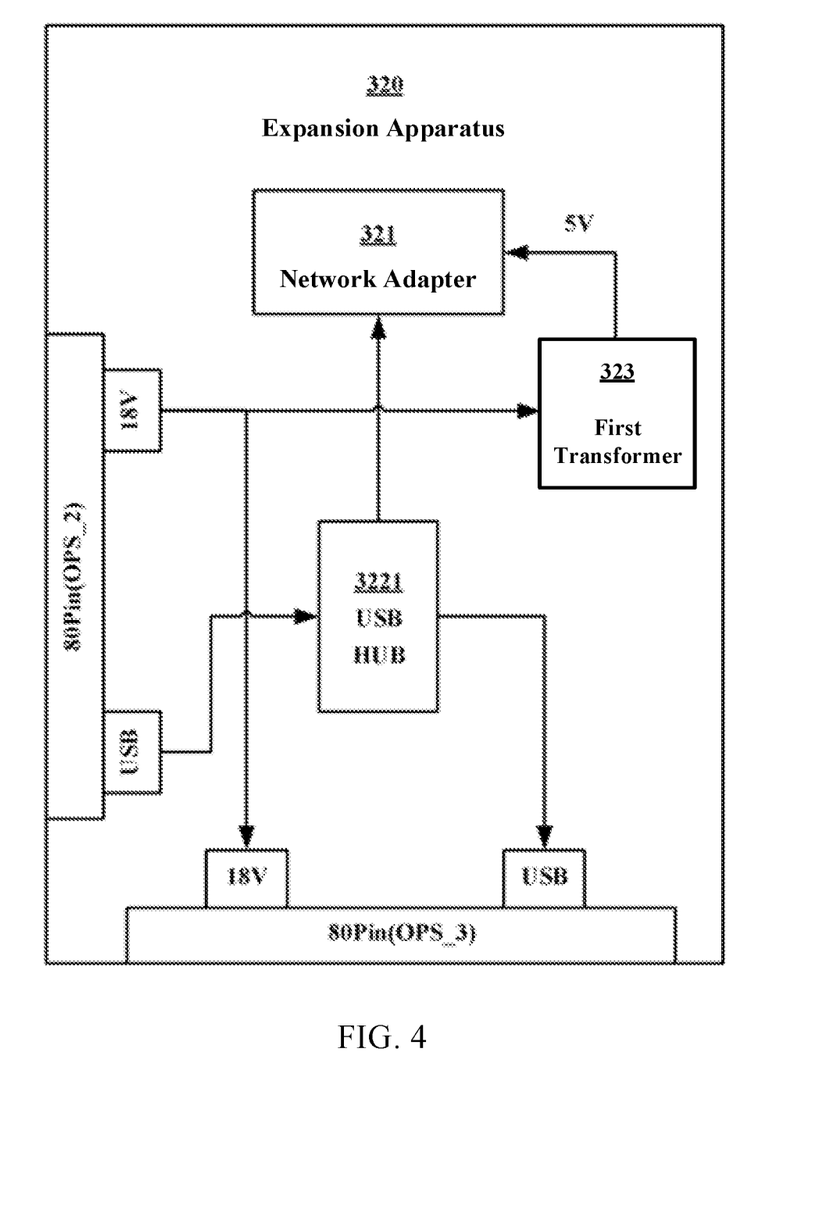
FIG. 4 schematically shows an expansion apparatus according to some embodiments of the present disclosure.

FIG. 4 schematically shows the expansion apparatus 320 of FIG. 3 in more detail, according to some embodiments of the present disclosure. As shown in FIG. 4, some terminals of the second OPS port OPS_2 in the form of 80 Pin can be regarded as an equivalent USB port (actually some terminals in the 80 Pin port), such as an equivalent USB2.0 or USB3.0 port. The equivalent USB port may include both data terminals and power terminals. Thus, the network adapter 321 can be connected with such an equivalent USB port for data transmission and optionally electrical power via this port. Similar to what is mentioned above with respect to FIG. 1, it should be understood that, in addition to the data terminals involved in the equivalent USB port, the second OPS port OPS_2 in the form of 80 Pin may also have one or more other terminals for data transmission. Optionally, the data transmission between the network adapter 321 and the second OPS port OPS_2 may also be implemented through other solutions.

In addition, optionally, the network adapter 321 may be further connected to the power terminals or some of the power terminals of the 80 Pin port, so as to obtain electrical power through the port. For example, as shown in FIG. 4, the 80 Pin port used as the second OPS port OPS_2 may have a power terminal for supplying a voltage of 18V, and the network adapter 321 may be connected to the power terminal of 18V to obtain corresponding electric power. Optionally, the voltage level required by the network adapter 321 may be different from the voltage level that the 80 Pin port can provide. In this situation, the first transformer 323 can be provided to transform a voltage such as 18V into a voltage suitable for the network adapter 321 (for example, 5V as shown in FIG. 4), so that the network adapter 321 can be indirectly connected to the power terminal of the 80 Pin port via the first transformer 323.

In the embodiment shown in FIG. 4, optionally, the network adapter 321 and the data terminal of the third OPS port OPS_3 can be respectively connected to the data terminal(s) in the second OPS port OPS_2 via a USB HUB 3221. The USB HUB can be used to expand one USB port into at least two USB ports. As mentioned above, a USB port may include both data terminals and power terminals. Therefore, the USB HUB can be used as the data port expander 322 shown in FIG. 3. The USB HUB 3221 can expand the equivalent USB port provided by the 80 Pin port into at least two equivalent USB ports for use by the network adapter 321 and the third OPS port OPS_3. Optionally, the USB HUB 3221 may be a passive USB HUB, an active USB HUB, a smart USB HUB, or the like. Optionally, other types of components can also be used as the data port expander 322 according to actual needs. Further optionally, a second transformer can be provided in the expansion apparatus 320, the input end of the second transformer may be directly connected to a power terminal of the 80 Pin port, such as a power terminal for providing 18V electric power, and the output end may be connected to a power terminal of the USB HUB 3221 to convert a voltage such as 18V into a voltage that the USB HUB 3221 can use, such as 3.3V, 1.8V, etc. Alternatively, the input end of the second transformer may be connected to the output end of the first transformer 323, and the output end may be connected to the USB HUB 3221, so that a voltage such as 5V obtained by the first transformer 323 is converted into a voltage that can be used by the USB HUB 3221, such as 3.3V, 1.8V, etc. The transformer mentioned in the present disclosure can be any suitable structure that can realize the voltage conversion function, such as a DC-DC converter, an LDO (low dropout linear regulator), and the like.

Figure 5:
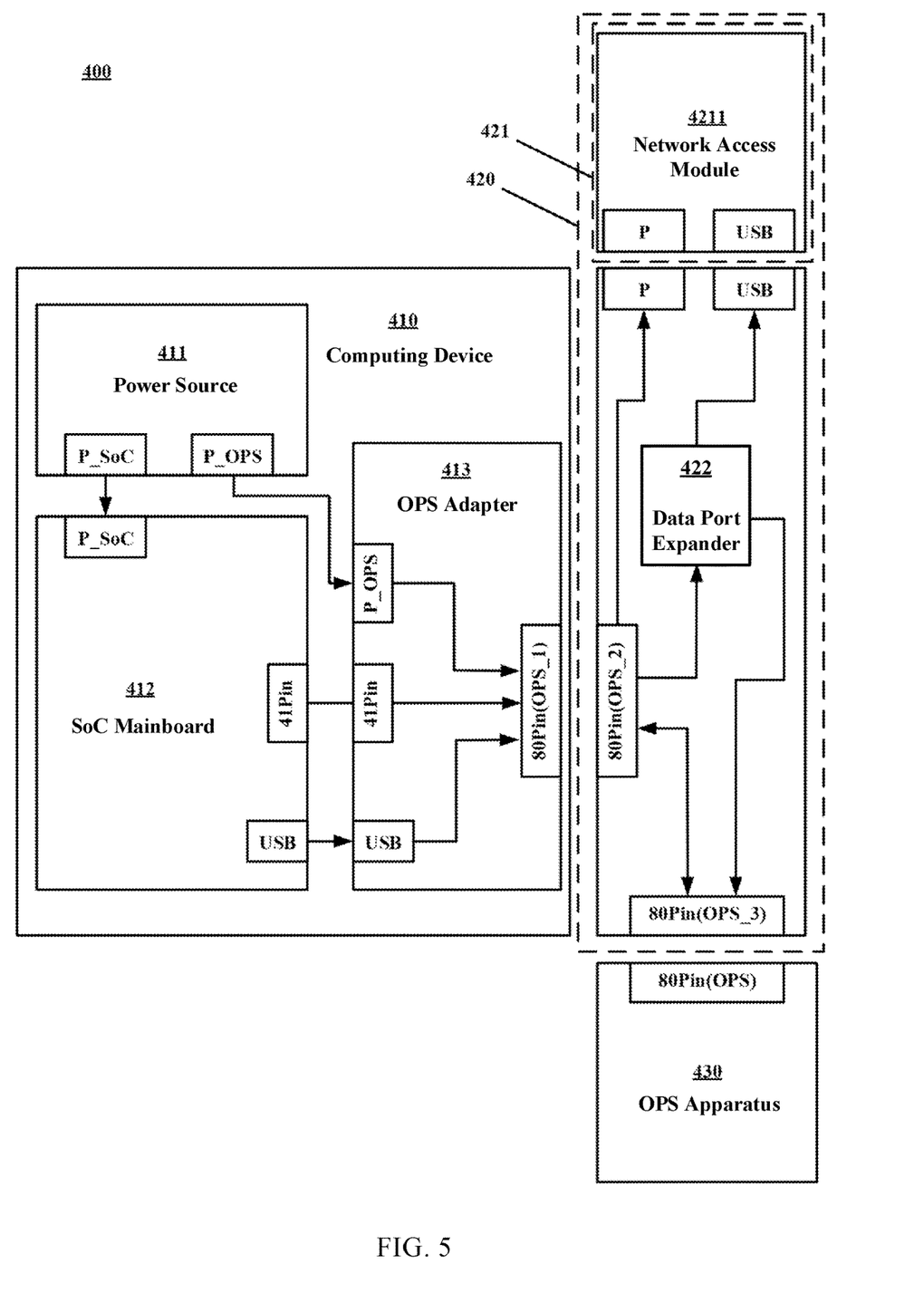
FIG. 5 schematically shows an expansion apparatus and a computing system according to some embodiments of the present disclosure.

FIG. 5 schematically shows an expansion apparatus 420 and a computing system 400 including the expansion apparatus 420 according to further embodiments of the present disclosure.

As shown in FIG. 5, the computing system 400 includes a computing device 410 and the expansion apparatus 420 for cooperating with the computing device 410. Similar to FIGS. 1, 2, and 3, the computing device 410 includes the first OPS port OPS_1, the expansion apparatus 420) includes the second OPS port OPS_2, and a network adapter 421, which are similarly coupled or connected. The structure of the computing device 410 shown in FIG. 4 is basically the same as that of the computing device 210 shown in FIG. 2 and that of the computing device 310 shown in FIG. 3, which will not be repeatedly described here. The differences between the expansion apparatus 420 and the expansion apparatus 320 will be described in detail hereinafter.

Compared with the expansion apparatus 320 shown in FIG. 3, the second OPS port OPS_2, the third OPS port OPS_3 and the data port expander 422 included in the expansion apparatus 420 may be arranged similarly to the corresponding parts in the expansion apparatus 320, and the various embodiments described with respect to the expansion apparatus 320 of FIG. 3 may also be applied to the expansion apparatus 420 shown in FIG. 5.

In the embodiment shown in FIG. 5, compared with the expansion apparatus 320 shown in FIG. 3, the expansion apparatus 420 may further include a data communication port, through which the network adapter 421 can be connected to the data terminal of the second OPS port OPS_2.

For example, the network adapter 421 may be an integrated network access module 4211. The network access module 4211 may be a module configured to provide the access function to one or more networks, such as one or more of 2G, 3G, 4G, 5G, or other networks. The module, for example, may take the form of a packaged PCB or a packaged PCB set and may include another data communication port that matches the data communication port of the expansion apparatus 420. Optionally, the another data communication port may be provided through a USB port or other suitable type of port. For example, a commercially available standard network access module may be used, or a network access module similar to the expansion apparatus 220 shown in FIG. 2 may be used. For example, for a 5G network, a commercially available standard 5G board (typically with a USB port) can be used as the network access module 4211, or an expansion apparatus 220 including a network adapter 221 that supports access to a 5G network can be used as the network access Module 4211.

Accordingly, the data communication port of the expansion apparatus 420 can be provided by a universal serial bus port, or alternatively by an OPS port or other suitable type of port. For example, the expansion apparatus 420 shown in FIG. 4 provides the data communication port through a USB port. As previously described, a USB port may include both data terminals and power terminals. In such an embodiment, the expansion module 420 may use a USB HUB as a data port expander to expand the equivalent USB port of the second OPS port OPS_2 (the 80 Pin port as shown) into at least two equivalent USB ports for use by the data communication port of the expansion apparatus 420 and the third OPS port OPS_3.

In some embodiments, the expansion apparatus 420 may further include a power port P, through which the network adapter may be connected to the power terminal in the second OPS port. The power port P may be directly or indirectly connected to the power terminal of the second OPS port OPS_2 to provide additional electrical power to the network adapter 421. For example, the power port P may be indirectly connected to the power terminal in the second OPS port OPS_2 via an additional transformer.

Figure 6:
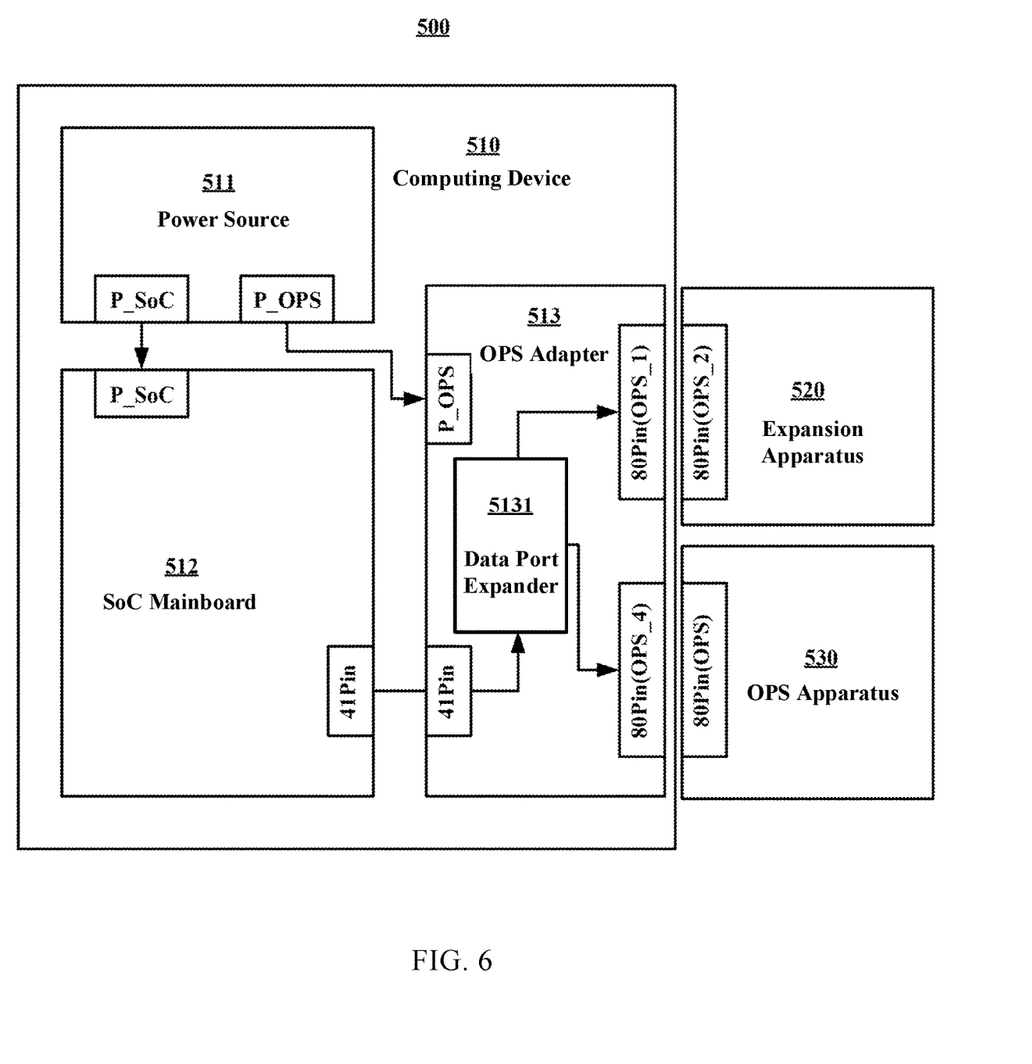
FIG. 6 schematically shows a computing system according to some embodiments of the present disclosure.

FIG. 6 schematically shows a computing system 500 according to some embodiments of the present disclosure.

As shown in FIG. 6, the computing system 500 includes a computing device 510 and an extension apparatus 520. The expansion apparatus 520) may be similar to the expansion apparatus described with respect to FIG. 1 or 2. The differences between the computing device 510 and the computing devices 210, 310, 410 shown in FIGS. 2, 3, and 5 will be described in detail below.

Compared to the computing devices 210, 310, 410 shown in FIGS. 2, 3 and 5, both the mainboard and optional power source included in the computing device may be arranged similarly as described with respect to the computing devices 210, 310, 410, and the various embodiments described with respect to computing device 210 also be applied to the computing device 510 shown in FIG. 6.

In the computing device 510 shown in FIG. 6, compared to the computing devices 210, 310, 410 shown in FIGS. 2, 3, and 5, the OPS adapter 513 may further include a fourth OPS port OPS_4, which may be configured for coupling (either fixed or pluggable coupling) to the OPS apparatus 530. The OPS apparatus 530 may be any suitable OPS apparatus, which can be coupled (either fixedly or pluggably coupled) through an OPS port to the fourth OPS port OPS_4 of the OPS adapter 513. For example, the OPS apparatus 530 may be an OPS box for providing a Windows system to a computing device such as a conference tablet. A data terminal of the fourth OPS port OPS_4 may be connected with the second data port (for example, some or all of the data terminals used for data transmission in the 41 Pin port shown in FIG. 6). As described with respect to FIG. 2, the second data port of the OPS adapter may include a type of port that matches the first data port of the mainboard and is coupled with the first data port for data transmission between the mainboard and the OPS adapter. Although FIG. 6 only shows the 41 Pin port of the SoC mainboard 512, it should be understood that, similar to what is described with respect to FIG. 2, the first data port and the second data port may include the part of the 41 Pin port and/or the USB port used for data transmission, or may also include other type of port for data transmission. Additionally, the OPS adapter may also include a power port, such as the P_OPS as shown, to draw power directly from the power source 511 of the computing device 510, or to draw power indirectly from the power source 511 via the SoC mainboard 512.

With the embodiment shown in FIG. 6, two OPS ports can be provided by making small modifications to an OPS adapter that originally provides only one OPS port, so that the expansion apparatus 520 is used to provide the function of accessing one or more networks while the OPS apparatus is used to provide other extended functions. Optionally, more than two OPS ports can also be provided by making small modifications to an OPS adapter that originally provides only one OPS port.

In some embodiments, the OPS adapter 513 may also include a data port expander 5131. The data terminal of the first OPS port OPS_1 and the data terminal of the fourth OPS port OPS_4 may be respectively connected to the second data port via the data port expander 5131. Optionally, the data port expander 5131 may be similarly arranged according to the data port expander 322 described with respect to FIGS. 3 and 4 so as to expand the second data port into at least two data ports for use by the first OPS port OPS_1 and the fourth OPS port OPS_4. Exemplarily, the combination of the second data port and the power port of the OPS adapter may provide an equivalent USB port, and the data port expander 5131 may employ a corresponding USB HUB so as to expand this equivalent USB port into at least two equivalent USB ports for access and use by the first OPS port OPS_1 and the fourth OPS port OPS_4, and in turn for use by the coupled expansion apparatus 520 and OPS device 530.

By studying the drawings, the disclosure and the appended claims, a person having the ordinary skills in the art can understand and realize variations of the disclosed embodiments when practicing the claimed protected subject matters. In the claims, the word "comprise" does not exclude other elements or steps, and "a" or "an" does not exclude more than one. The mere fact that certain measures are recorded in mutually distinct dependent claims does not indicate that the combination of these measures cannot be used profitably.

In the description of this specification, the terms "an embodiment", "some embodiments", "example", "specific example" or "some examples" mean that specific features, structures, materials, or characteristics described in connection with the embodiment or example are included in at least one embodiment or example of this disclosure. In this specification, the schematic representation of the above terms need not be directed to the same embodiment or example. Moreover, the specific features, structures, materials, or characteristics described may be combined in a suitable manner in any one or more embodiments or examples. In addition, without contradicting each other, a person having ordinary skills in the art may combine and incorporate the different embodiments or examples described in this specification and the features of the different embodiments or examples.

What is claimed is:

1. An expansion apparatus for cooperating with a computing device, the computing device comprising a first OPS port, the expansion apparatus comprising:
   a second OPS port configured for coupling to the first OPS port of the computing device, wherein a portion of the second OPS port is configured as a first equivalent USB port, and the first equivalent USB port comprises a data terminal;
a third OPS port configured for coupling to an OPS apparatus, wherein a portion of the third OPS port is configured as a second equivalent USB port, and the second equivalent USB port comprises a data terminal;
a network adapter configured for connecting the computing device to a network, wherein the network adapter comprises a mobile communication network adapter that allows the computing device to access a mobile communication network;
a USB HUB configured as connecting the network adapter and a data terminal of the second equivalent USB port with a data terminal of first equivalent USB port.

2. The expansion apparatus according to claim 1, wherein the network adapter is further connected with a power terminal of the second OPS port for power transmission.

3. The expansion apparatus according to claim 2, further comprising a first transformer, wherein the network adapter is connected with the power terminal of the second OPS port via the first transformer.

4. The expansion apparatus according to claim 3, wherein a power terminal of the third OPS port is connected with the power terminal of the second OPS port.

5. The expansion apparatus according to claim 1, wherein the computing device comprises a conference interaction device.

6. The expansion apparatus according to claim 1, wherein the coupling comprises pluggable coupling.

7. The expansion apparatus according to claim 4, wherein the coupling comprises pluggable coupling.

8. A computing system comprising:
a computing device comprising a first OPS port;
an expansion apparatus comprising:
a second OPS port configured for pluggably coupling to the first OPS port of the computing device, wherein a portion of the second OPS port is configured as a first equivalent USB port, and the first equivalent USB port comprises a data terminal;
a third OPS port configured for coupling to an OPS apparatus, wherein a portion of the third OPS port is configured as a second equivalent USB port, and the second equivalent USB port comprises a data terminal;
a network adapter configured for connecting the computing device to a network, wherein the network adapter comprises a mobile communication network adapter that allows the computing device to access a mobile communication network;
a USB HUB configured as connecting the network adapter and a data terminal of the second equivalent USB port with a data terminal of first equivalent USB port.

9. The computing system according to claim 8, wherein the computing device comprises:
a mainboard comprising a first data port;
an OPS adapter comprising a second data port and the first OPS port, wherein the second data port is connected with the first data port, and a data terminal of the first OPS port is connected with the second data port.

10. The computing system according to claim 9, wherein the OPS adapter further comprises a fourth OPS port configured for pluggably coupling to an OPS apparatus, and a data terminal of the fourth OPS port is connected with the second data port.

11. The computing system according to claim 10, wherein the OPS adapter further comprises a data port expander, wherein the second data port is respectively connected with the data terminal of the first OPS port and the data terminal of the fourth OPS port via the data port expander.

12. The computing system according to claim 9, wherein the computing device further comprises a power source configured for at least one of the following:
providing power to the mainboard; and
providing power to the expansion apparatus through the OPS adapter.

* * * * *